(12) United States Patent
Malhotra et al.

(10) Patent No.: US 10,679,610 B2
(45) Date of Patent: Jun. 9, 2020

(54) EYES-OFF TRAINING FOR AUTOMATIC SPEECH RECOGNITION

(71) Applicant: Microsoft Technology Licensing, LLC, Redmond, WA (US)

(72) Inventors: Hemant Malhotra, Newark, CA (US); Shuangyu Chang, Fremont, CA (US); Pradip Kumar Fatehpuria, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/036,721

(22) Filed: Jul. 16, 2018

(65) Prior Publication Data

US 2020/0020319 A1 Jan. 16, 2020

(51) Int. Cl.
| | | |
|---|---|---|
| *G10L 15/06* | (2013.01) | |
| *G06F 40/279* | (2020.01) | |
| *G06F 40/166* | (2020.01) | |
| *G10L 15/02* | (2006.01) | |
| *G10L 15/26* | (2006.01) | |

(52) U.S. Cl.
CPC .......... *G10L 15/063* (2013.01); *G06F 40/166* (2020.01); *G06F 40/279* (2020.01); *G10L 15/02* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 8,032,372 B1* | 10/2011 | Zimmerman | ....... | G06F 17/2818 704/235 |
| 10,109,273 B1* | 10/2018 | Rajasekaram | ........ | G10L 15/183 |
| 2005/0033574 A1* | 2/2005 | Kim | ........................ | G10L 15/22 704/251 |
| 2006/0247913 A1* | 11/2006 | Huerta | .................... | G10L 15/22 704/1 |
| 2008/0201135 A1* | 8/2008 | Yano | ................... | G10L 15/1822 704/201 |
| 2009/0228273 A1* | 9/2009 | Wang | .................. | G06F 3/04883 704/235 |

(Continued)

FOREIGN PATENT DOCUMENTS

EP     1341156 A1    9/2003

OTHER PUBLICATIONS

"International Search Report and Written Opinion Issued in PCT Application No. PCT/US2019/037585", dated Oct. 7, 2019, 12 pages.

*Primary Examiner* — Douglas Godbold
(74) *Attorney, Agent, or Firm* — Alleman Hall Creasman & Tuttle LLP

(57) ABSTRACT

A method for eyes-off training of a dictation system includes translating an audio signal featuring speech audio of a speaker into an initial recognized text using a previously-trained general language model. The initial recognized text is provided to the speaker for error correction. The audio signal is re-translated into an updated recognized text using a specialized language model biased to recognize words included in the corrected text. The general language model is retrained in an "eyes-off" manner, based on the audio signal and the updated recognized text.

20 Claims, 4 Drawing Sheets

(56) References Cited

U.S. PATENT DOCUMENTS

| | | | |
|---|---|---|---|
| 2010/0104087 A1* | 4/2010 | Byrd | H04M 3/42221 |
| | | | 379/265.09 |
| 2010/0125458 A1* | 5/2010 | Franco | G10L 15/22 |
| | | | 704/255 |
| 2010/0312555 A1 | 12/2010 | Plumpe et al. | |
| 2013/0013311 A1* | 1/2013 | Zheng | G10L 15/197 |
| | | | 704/257 |
| 2013/0332161 A1 | 12/2013 | Beach et al. | |
| 2016/0267380 A1* | 9/2016 | Gemello | G06N 3/084 |
| 2017/0229120 A1* | 8/2017 | Engelhardt | G10L 15/19 |
| 2018/0188948 A1* | 7/2018 | Ouyang | G06F 3/04886 |
| 2018/0233131 A1* | 8/2018 | Aleksic | G10L 15/1815 |
| 2018/0279010 A1* | 9/2018 | Watanabe | H04N 21/4884 |

* cited by examiner

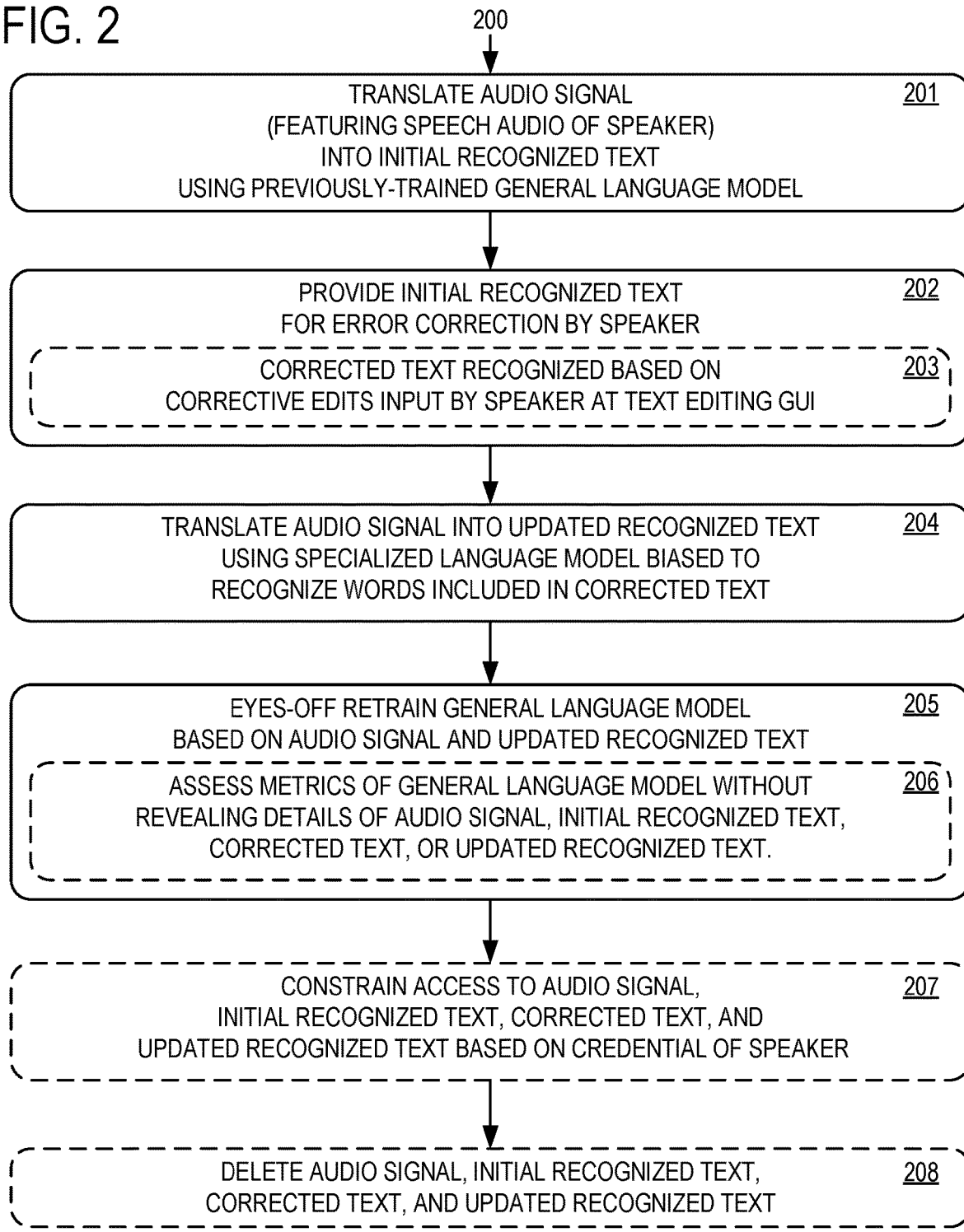

EYES-OFF TRAINING FOR AUTOMATIC SPEECH RECOGNITION

BACKGROUND

Dictation systems may require a large number of exemplary labelled speech audio data for training. Acquiring the labelled speech audio data typically requires humans to label the data so as to accurately indicate words present in the speech audio data. Furthermore, performance of a dictation system may be sensitive to context of the speech audio data (e.g., speaker accent and speaking style, domain-specific vocabulary, etc.), and good performance in a particular context may require exemplary labelled speech audio data for that particular context. However, in many contexts, human labelling of data may be infeasible. For example, dictation systems may be used to input private and/or confidential data, and it may not be feasible to provide the private and/or confidential data to a third party for labelling. Furthermore, human labelling of data may be expensive, time-consuming, and/or error-prone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for eyes-off training of a dictation system includes translating an audio signal featuring speech audio of a speaker into an initial recognized text using a previously-trained general language model and a previously-trained general acoustic model. The initial recognized text is provided to the speaker for error correction. The audio signal is re-translated into an updated recognized text using a specialized language model biased to recognize words included in the corrected text. The general language model is retrained in an "eyes-off" manner, based on the updated recognized text.

BRIEF DESCRIPTION OF THE DRAWINGS

FIG. 2 shows a method for eyes-off training of a dictation system.

DETAILED DESCRIPTION

Figure 1:
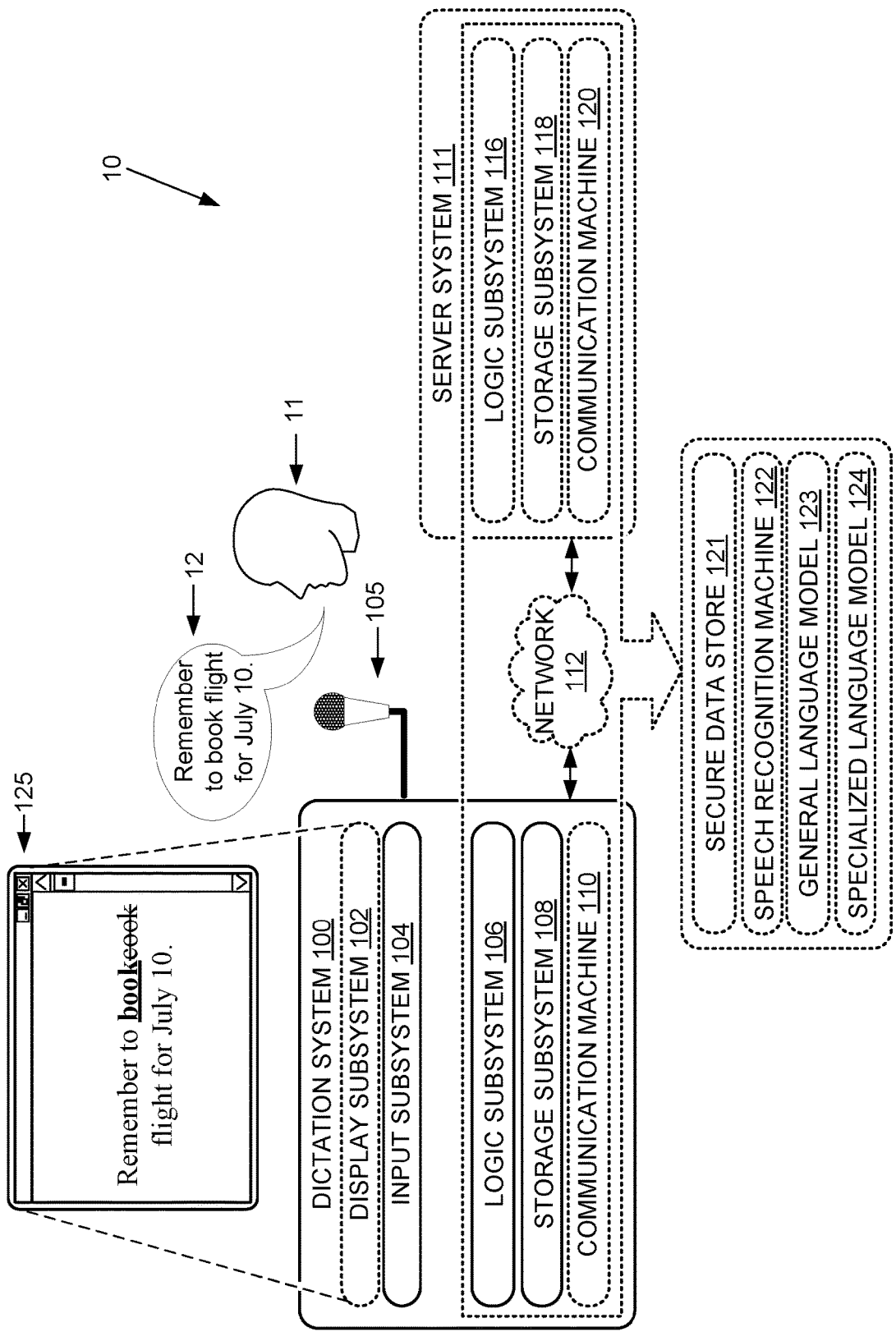
FIG. 1 shows a system architecture for a dictation system.

The present disclosure is directed to a dictation system which is configured to convert speech audio into an initial recognized text. If the initial recognized text is incorrect, a user of the dictation system can supply corrections, e.g., by editing the initial recognized text to produce a corrected text. The dictation system is configured to convert the speech audio to produce updated recognized text, based on a specialized language model taking the corrections into account. The specialized language model may be biased to recognize words from the corrected text, so as to recognize words that may have been incorrectly recognized in the initial recognized text. As such, the updated recognized text may reflect the actual words in the speech audio with a relatively high accuracy.

The updated recognized text may be used as a label for the speech audio, to train one or more components of the dictation system to improve its ability to accurately recognize text. "Labelled speech audio data" may be used herein to describe audio data associated with a text label indicating a word (e.g., a single word or any longer phrase) featured in the audio data. The dictation system may achieve varying quality of results depending on scenarios in which it is used, e.g., for different speaking styles, languages, dialects, vocabularies, and/or individual users. Training the dictation system with labelled speech audio data reflecting real usage may improve future dictation results in similar scenarios, e.g., future usage by the same user and/or future usage by a different user having a similar speaking style.

The speech audio, initial recognized text, corrected text, and updated recognized text may be private data of the user. The dictation system can be trained in an "eyes-off" fashion based on the private data, without revealing the private data to any party other than the user. "Eyes-off" may be used herein to describe any scenario in which user data regarding a human user is held secure and privately, so that the user data is fully controlled by the human user and cannot be accessed by any other party. For example, the dictation system can be eyes-off trained based on the updated recognized text and speech audio, without requiring any party other than the user to provide labels for the speech audio. Accordingly, the dictation system may be trained to improve future dictation results for the user without compromising any private or potentially sensitive information input by the user using the dictation system.

Although the dictation systems and methods described herein facilitate "eyes-off" training, they may also be utilized for training a dictation system even when "eyes-off" training is not a concern, e.g., training based on freely available, public speech audio datasets with labelled speech audio data and/or corrections to recognized text supplied by expert human transcribers. Furthermore, the dictation systems and methods described herein may increase an efficiency of training dictation systems (in an "eyes-off" context or otherwise), by reducing an amount of labelled speech audio data that needs to be supplied by humans, and by providing an efficient and intuitive workflow to humans in the form of user interfaces for supplying corrected text. Dictation systems may require large amounts of labelled speech audio data for training. A dictation system according to the present disclosure may generate labelled speech audio data based on corrections supplied by end user humans as opposed to purpose-specific trainers, and use the generated labelled speech audio data to enhance a general language model so that it may recognize, e.g., user-specific, domain-specific, organization-specific, and/or population-specific features.

FIG. 1 shows relevant aspects of a computing environment 10 in which a speaker 11 interacts with a dictation system 100. Dictation system 100 includes an input subsystem 104, which includes a microphone 105 configured to convert sound into audio signals. As shown at 12, speaker 11 may interact with dictation system 100 by speaking so that the microphone captures speech audio as computer-readable audio signals (e.g., digital audio). As shown at 12, speaker 11 dictates a brief memo saying to "remember to book flight for July 10." Dictation system 100 further includes a logic subsystem 106 and a storage subsystem 108. Logic subsystem 106 and storage subsystem 108 may perform any of the methods described herein, e.g., to process the audio signals captured by microphone 105 in order to convert speech audio into text.

Dictation system 100 optionally includes a communication machine 110 configured to communicatively couple, via computer network 112, with a server system 111. Computer network 112 may be any suitable computer network, e.g., the Internet, or a secure private network. Server system 111 includes a logic subsystem 116, a storage subsystem 118, and a communication machine 120.

Dictation system 100, optionally in cooperation with server system 111, is configured to instantiate one or more machines including secure data store 121, speech recognition machine 122, general language model 123, and specialized language model 124. The methods and processes described herein may be associated with one or more of these machines. In particular, logic subsystem and storage subsystem 108 of dictation system 100 may instantiate these machines (e.g., by executing code to enact the methods and processes described herein). Alternately or additionally, logic subsystem and storage subsystem 118 of server system 111 may instantiate these machines in order to process data received by input subsystem 104 of dictation system 100. Accordingly, the methods and processes described herein may be enacted by any suitable combination of operations of logic subsystem 106 and storage subsystem 108 of dictation system 100, and/or logic subsystem 116 and storage subsystem 118 of server system 111.

Speech recognition machine 122 may be implemented via any suitable combination of state-of-the-art and/or future speech recognition techniques. For example, speech recognition machine 122 may include one or more machine learning and/or neural network models configured to receive audio input and to output one or more representations of candidate words.

Speech recognition machine 122 may be configured to assess, for each candidate word associated with a speech audio input, a confidence for the candidate word. "Word" may be used herein to describe any word, phrase, or other utterance (e.g., idioms, non-verbal sounds, etc.) which may occur in speech audio. "Vocabulary" may be used herein to describe any features of speech of a speaker, population, organization, field of endeavor, etc. For example, vocabulary features include word usage statistics, grammatical conventions, phrases, idioms, pronunciation, accent, jargon, domain-specific terminology, etc.

Speech recognition machine 122 is configured to use one or more previously-trained language models to convert speech audio to text. For example, speech recognition machine 122 is configured to use general language model 123 and/or specialized language model 124. As described in more detail below, a language model may be previously trained to recognize words for particular vocabularies and/or to broadly recognize words from one or more languages. For example, general language model 123 may be previously trained to recognize words in the English language, without being specific to any particular dialect/population of English language speakers. Based on using different language models, speech recognition machine 122 may be trained to recognize speech for speakers with different vocabularies, e.g., by re-training general language model 123 as will be described herein.

Dictation system 100 may be configured to present a text editing user interface (UI) to allow speaker 11 to supply corrections for recognized text resulting from speech recognition machine 122 converting speech audio to text. Dictation system 100 may optionally include a display subsystem 102, and may be further configured to visually present the text editing UI as a text editing graphical user interface (GUI) 125 using display subsystem 102. Text editing GUI 125 shows the text result of converting speech audio to text, as well as a correction supplied by the user (shown as "redline" with added text in bold with underlining, and deleted text shown in strikeout). As shown, the initial result of converting speech audio to text may be incorrect, e.g., the initial recognized text says "remember to cook flight for July 10," due to misrecognition of the word "book" as the similar word "cook." Accordingly, the user may view the initial recognized text to assess performance of the dictation system, and/or supply a correction to indicate what was actually said.

Although FIG. 1 shows a text editing UI in the form of text editing GUI 125, a dictation system may use any other suitable user interface to present the results of converting speech audio to text and/or to receive corrections supplied by speaker 11. For example, instead of showing a GUI 125 with "redline" corrections, display subsystem 102 may be configured to show a different GUI configured to show, for each word in the recognized text, a drop-down and/or pop-up menu showing one or more alternate word choices (e.g., the word "cook" in the initial recognized text may be clicked to bring up a drop-down menu offering alternate word choices such as "book.") Alternately or additionally, the dictation system may use an audio and/or plain-text interface to present recognized text to the user and/or prompt the user to provide corrections to the recognized text. For example, the dictation system may repeat recognized text back to the speaker 11 and prompt speaker 11 to confirm whether the recognized text was accurately recognized and/or to supply a correction. Input subsystem 104 may include any suitable input devices to allow speaker 11 to supply corrections and otherwise interact with dictation system 100 (in addition to interacting via dictation input via microphone 105). Non-limiting examples of input devices of input subsystem 104 include keyboard, mouse, touch-screen, joystick, etc. For example, input subsystem 104 may include a keyboard and mouse configured to manipulate GUI 125 (e.g., to select text, delete text, and input corrected text).

Dictation system 100 may be used in conjunction with any suitable software applications in which speaker 11 may wish to provide text input via dictation. For example, GUI 125 may be presented as a component of a software application to allow text input via dictation and editing/correction of the text input. Non-limiting examples of software applications that may incorporate GUI 125 include a dedicated dictation application, an email program, a word processor program, a calendar/scheduling program, etc.

After speaker 11 supplies corrections to the initial recognized text, text editing GUI 125 is configured to recognize a corrected text including the speaker's error corrections to the initial corrected text, based on the corrective edits input by the speaker. For example, as shown in FIG. 1, speaker 11 may use GUI 125 to delete the word "book" and replace it with the word "cook." Accordingly, GUI 125 recognizes the corrected text including the replacement: "remember to book flight for July 10."

A language model (e.g., general language model 123 and/or specialized language model 124) may be trained based on labelled speech audio data to improve quality of future recognition results using the language model. However, dictation system 100 is generally used to convert speech audio data to text without any prior knowledge of the content of the speech audio data, e.g., speech audio data captured at microphone 105 is not generally accompanied by labels indicating the actual words being said.

The corrected text recognized by GUI 125 may correct one or more errors from the initially recognized text. Accordingly, at least portions of the corrected text may better correspond to the speech audio, compared to the initially recognized text. However, the speaker 11 may revise the text beyond the simple correction of errors. For example, the speaker 11 may re-word the text by changing word order, adding or deleting words, changing word choice, etc., so that the corrected text deviates from the actual words in the speech audio.

The corrected text may be used to train and/or generate a language model based on the contents of the corrected text, referred to herein as a corrected text model. The corrected text model may be biased to recognize words based on statistical and/or vocabulary features of the corrected text, e.g., the corrected text model may recognize words that were present in the corrected text, in preference to recognizing words that were not present in the corrected text. The corrected text model may be able to recognize words that were missed by general language model 123. For example, as shown in FIG. 1A, the corrected text includes the word "book" in place of the word "cook." Accordingly, a corrected text model based on this corrected text may be more likely to recognize the word "book," instead of the word "cook." However, the corrected text model may not always achieve an accurate recognized text, e.g., when the corrected text includes revisions going beyond the simple correction of incorrect words. Nevertheless, in some examples, the corrected text model may be based only on the corrected text, e.g., based on a final corrected version of text based on all corrections supplied by the speaker 11.

Dictation system 100 may generate labels for speech audio using a specialized language model 124. In some examples, specialized language model 124 is an interpolation (e.g., a weighted combination) of the corrected text model and the general language model 123. Approaches to formulating an interpolation of language models will be discussed in detail below. Specialized language model 124 may be biased to recognize words that were missed by general language model 123 using the corrected text model, while falling back to the general language model 123 when the corrected text model may be unable to accurately recognize a word (e.g., when the corrected text model is unable to resolve an utterance with at least a threshold confidence). For example, an acoustical model may be used to assess quality of recognition using the converted-text language model, in order to fall back to using general language model 123 when a word recognized with the converted-text language model is a poor acoustical match for the speech audio.

Accordingly, specialized language model 124 may be used to convert the original audio signal (which was previously converted into the initial recognized text) into an updated recognized text. The updated recognized text may include words from the corrected text recognized by the corrected text model, as well as words from the initial recognized text (recognized by the general language model 123 when the corrected text model is unable to accurately recognize a word). The updated recognized text may therefore include words that the general language model 123 mis-recognized, while also recognizing words that were removed/replaced in the corrected text despite being present in the speech audio. As such, the updated recognized text may include a higher proportion of correctly recognized words that are actually present in the speech audio, as compared to the initial recognized text or the corrected text.

Accordingly, the updated recognized text may accurately represent the words in the speech audio, making it suitable for use as a label for the speech audio data. By labelling speech audio data with updated recognized text, dictation system 100 may be able to generate a plurality of new labelled speech audio data for use as training examples.

Generating the labels does not require input from any party other than speaker 11, so the contents of the speech audio, initial recognized text, corrected text, and updated recognized text can remain private to speaker 11. Accordingly, labels generated using specialized language model 124 may be used for eyes-off training and/or retraining of dictation system 100, so that the speech recognition capabilities of dictation system 100 may be improved without compromising speaker 11's privacy. Furthermore, because there is no limit to the number of end users that can correct text during the course of normal use, a huge amount of updated training labels can be acquired without placing any additional training burden on humans.

Eyes-off training and/or retraining of dictation system 100 may include eyes-off training of general language model 123, e.g., to improve the capability of general language model 123 for recognizing words that general language model 123 previously mis-recognized which were corrected in the corrected text. General language model 123 may be trained in any suitable fashion using the labelled speech audio data, as will be further described below. For example, general language model 123 may include an N-gram model and may be trained via an N-gram counting and smoothing algorithm. In some examples, general language model 123 may be trained using the labelled speech audio data, e.g., to maximize an expected likelihood of recognizing a word indicated by a label, in the audio data corresponding to that label. In some examples, general language model 123 may be trained using the corrected text, irrespective of the audio data, e.g., to learn a statistical distribution of words/phrases in the corrected text. For example, general language model 123 may model prior probabilities for possible word sequences (with or without consideration of audio) and accordingly may be trained on corrected text (with or without using audio during training). Alternately or additionally, the labelled speech audio data may be used to train the general language model 123 using any supervised and/or unsupervised training methodology. For example, general language model 123 may include a neural network configured to recognize words in audio data, and the neural network may be trained using the backpropagation algorithm and gradient descent based on an objective function configured to assess the accuracy of recognizing a word indicated by a label, in the audio data corresponding to that label.

Dictation system 100, and optionally server system 111, may cooperate to provide "eyes-off" dictation services. Accordingly, secure data store 121 is configured to store and/or process private data in a secure, private manner so that access is constrained by a credential associated with the human speaker 11. For example, the methods and processes herein may be used to provide eyes-off dictation services, and for eyes-off training and/or retraining of language models for speech recognition. In some examples, the audio signal, the initial recognized text, the corrected text and the updated recognized text are all considered private data of the speaker. Accordingly, access to this private data is constrained by a credential of the speaker. For example, the private data can be stored in secure data store 121.

In some examples, specialized language model 124 and/or general language model 123 may be considered private data of the speaker 11. For example, when general language model 123 is eyes-off trained based on labelled speech audio data, general language model 123 may indirectly encode vocabulary features of the speaker 11 which speaker 11 may wish to keep private (e.g., word choice, proper nouns, and any other features of speaking style/vocabulary which speaker 11 may wish to keep private). Accordingly, access to specialized language model 124 and/or general language model 123 may be constrained by a credential of speaker 11. In some examples, private data associated with specialized language model 124 and/or general language model 123 may be stored in secure data store 121, to facilitate utilization of the models in a secure, private fashion.

Private data may generally be encrypted and transmitted and/or stored securely using any suitable combination of state-of-the-art and/or future computer security techniques. For example, private data may be encrypted using any suitable combination of symmetric and/or asymmetric cryptography techniques. Private data may be held only in an encrypted form, and decrypted only as long as needed for processing. Alternately or additionally, private data may be processed using homomorphic encryption techniques. Encryption keys associated with private data may be held by the human user, e.g., on a personal computing device. Alternately or additionally, the human user may designate a trusted 3$^{rd}$ party (e.g., a purveyor of dictation services running on server system 111) to hold encryption keys associated with private data. Accordingly, the human user may control when dictation system 100 and/or server system 111 access private data (e.g., for processing to assist the human user with dictation tasks). Private data may be deleted when no longer needed for processing.

Optionally, in some eyes-off scenarios, the human user may grant partial permissions to one or more parties, e.g., permission to access metadata, anonymized data, statistical data, general language model 123 and/or specialized language model 124, or any other data deemed suitable for release by the human user. The human user may be able to issue a command to delete and/or revoke access to the private data at any time.

In some examples, private data belonging to a speaker may be associated with an organization, team, and/or enterprise to which the speaker belongs. Accordingly, access to the private data may be constrained based on credentials associated with members of the organization, team, and/or enterprise (e.g., alternately or additionally to private credentials of the speaker).

While they system can enforce privacy as described herein, a non-private implementation can be used if that is desired for a particular application.

FIG. 2 shows an example method 200 for eyes-off training of a dictation system, e.g., by training language models of the dictation system. Method 200 includes, at 201, translating an audio signal featuring speech audio of a speaker into an initial recognized text using a previously-trained general language model, e.g., previously-trained general language model 123.

Figure 3A:
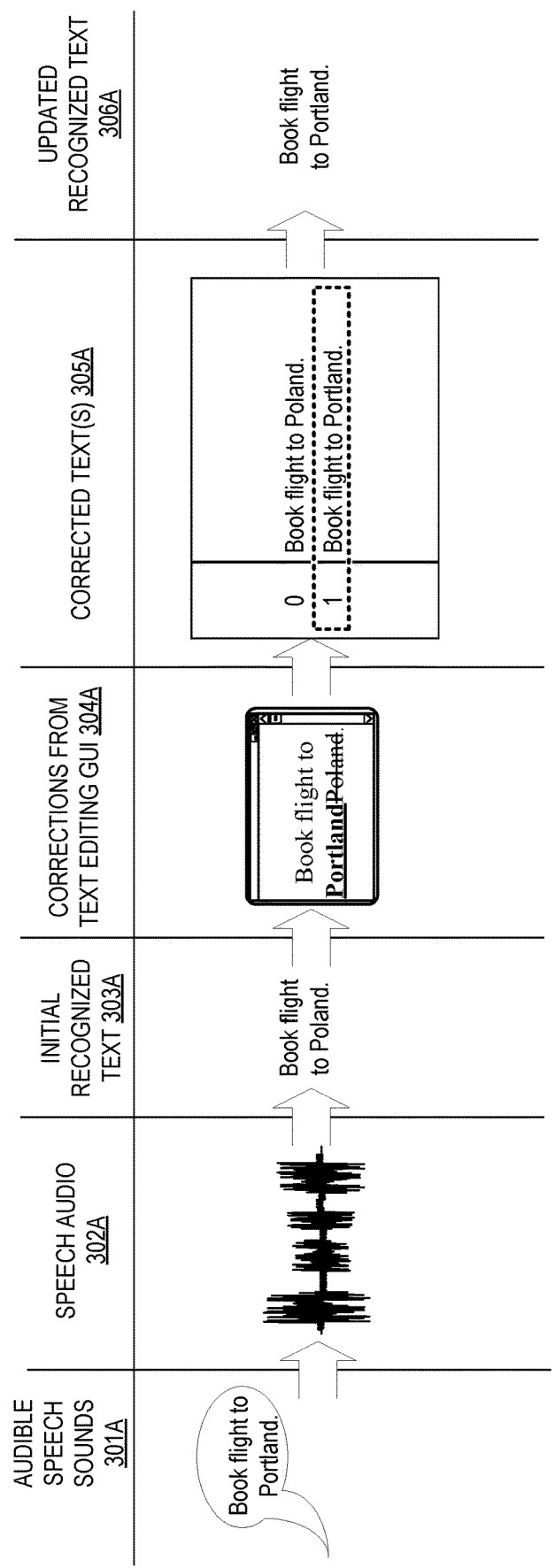
FIGS. 3A-3B show dataflow for eyes-off training a dictation system in exemplary scenarios.

FIG. 3A shows an example of data flow during eyes-off training of a dictation system. FIG. 3A depicts audible speech sounds 301A captured by the dictation system. These audible speech sounds 301A may be captured by a microphone and converted into a computer-readable audio signal. Accordingly, FIG. 3A depicts speech audio 302A in the form of a waveform. As depicted, the waveform includes 4 segments having relatively higher amplitudes, corresponding to the four words in the audible speech sounds (e.g., "book", "flight", "to", and "Portland").

FIG. 3A further depicts initial recognized text 303A translated from the speech audio. Initial recognized text 303A includes an error, namely, recognizing the word "Poland" when the audible speech sounds 301A actually included the similar-sounding word "Portland."

Method 200 further includes, at 202, providing the initial recognized text for error correction by a speaker, and recognizing corrected text based on the error corrections. In some examples, at 203, the corrected text is recognized based on corrective edits input by the speaker at a text editing user interface, e.g., GUI 125. FIG. 3A further depicts corrections 304A from a text editing GUI. As shown, the speaker has supplied corrections to indicate that the word "Poland" was not actually featured in the speech audio and to replace the mis-recognized word with the correct word, "Portland." In some examples, in addition to providing the initial recognized text for error correction by the speaker, method 200 may further include providing the originally-recorded speech audio for reference, e.g., so that the speaker can listen to the speech audio to confirm what was actually said, before supplying appropriate corrections.

As shown in FIG. 3A, the speaker may supply one or more corrected text(s) 305A. For example, corrected text(s) include the initial recognized text shown as a "zeroth" (uncorrected) text, and a first corrected text in which the mis-recognized word "Poland" is corrected to "Portland."

Method 200 further includes, at 204, translating the audio signal into an updated recognized text using a specialized language model which is biased to recognize words included in the corrected text(s). For example, the specialized model may be an interpolation (e.g., a weighted mixture) of the previously-trained general language model and a corrected text model which is configured to recognize words from the corrected text, e.g., specialized language model 124 as shown in FIG. 1.

In some examples, the audio signal may be held in the same format (e.g., with regard to audio codec, bitrate, etc.) for translation into the initial recognized text with the general language model as well as for translation into the updated recognized text using the specialized language model. Alternately, the audio signal may be converted into a different format for translation with the specialized language model.

In the example shown in FIG. 3A, a corrected text model may be biased to recognize words from the corrected text, e.g., to recognize words from a limited vocabulary including the words "book," "flight," "to," and "Portland." The specialized language model may be biased to recognize this limited vocabulary of words. Accordingly, when encountering the fourth segment of speech audio, which was previously converted to the text "Poland," the word "Poland," is not in the limited vocabulary but the similar-sounding word "Portland" is. Thus, as shown in FIG. 3A, the updated recognized text 306A replaces the mis-recognized word "Poland" with "Portland" based on the corrected text(s) 305A. Accordingly, updated recognized text 306A is an accurate transcription of the original audible speech sounds 301A.

Method 200 further includes, at 205, eyes-off retraining the general language model based on the updated recognized text and optionally based on the audio signal. For example, as shown in FIG. 3A, since updated recognized text 306A is an accurate transcription of the speech audio 302A, updated recognized text 306A is a suitable label for the speech audio 302A. Accordingly, speech audio 302A and updated recognized text 306A may be used as labelled speech audio data for training a language model.

The labelled speech audio data based on speech audio 302A and updated recognized text 306A may be suitable for training and/or retraining a language model to recognize words in the context in which the speaker actually used the dictation system (e.g., the language model may be able to recognize previously-unknown words such as "Portland", and/or the language model may be better able to recognize words relating to booking flights). Furthermore, the labelled speech audio data is automatically generated by the dictation system using the specialized language model, without requiring any human oversight other than the correction of text by the speaker in the normal course of using the dictation system. Accordingly, method 200 may facilitate retraining the generalized language model for a dictation system in a completely "eyes-off" fashion, where only the speaker is ever allowed to access any of the audio or recognized text from the dictation process. Accordingly, the dictation system may be retrained on data from real usage scenarios, even when the usage scenarios include dictation of confidential, private, and/or secure information. Throughout the dictation and/or training process, any relevant data may be maintained as private data of the speaker, e.g., on secure data store 121. In some examples, after retraining the general language model based on the updated recognized text and optionally based on the audio signal, private data of the speaker may be deleted, e.g., by deleting the audio signal, the initial recognized text, and the updated recognized text. In some examples, the audio signal may not be used for retraining the general language model. Accordingly, the audio signal may be deleted after initial recognition of the initial recognized text and before retraining the general language model.

In some examples, instead of or in addition to training and/or retraining the general language model, method 200 may further include eyes-off training a speaker-specific language model for the speaker based on the audio signal and the updated recognized text. In some examples, access to the speaker-specific language model is constrained by a credential of the speaker. "Speaker-specific model" may be used herein to refer to any language model which is trained with specific regard to dictation by any particular population of one or more speakers, e.g., speakers sharing a language and/or dialect, speakers who are all part of a particular team, organization, or enterprise, etc. In some examples, the general model, specialized model, and/or any speaker-specific language model(s) may be considered private data of the speaker, team, organization, and/or enterprise.

In some examples, at 206, eyes-off training a language model may include assessing one or more metrics of the language model. The one or more metrics may be defined so that results of the metrics do not reveal any private data of the speaker, e.g., so that the results do not reveal any details of the audio signal, the initial recognized text, the corrected text, or the updated recognized text.

In some examples, the audio signal, initial recognized text, corrected text, and updated recognized text are considered private data of the speaker. Accordingly, at 207, method 200 includes constraining access to these private data based on a credential of the speaker, e.g., by holding all of the private data in secure data store 121 so that it is protected according to the credential. At 208, method 200 may further comprise deleting the private data (e.g., after using the updated recognized text for re-training the general language model).

In some examples, the corrected text upon which the corrected text model and/or specialized language model is based is a final version of the text, based on all of the corrected inputs input by the speaker. For example, in FIG. 3A, the speaker inputs only one correction, to change the word "Poland" to "Portland." Accordingly, the corrected text model and specialized language model may be based on the final version of the text including this correction.

In other examples, the final version of the text may not be suitable for the corrected text model and/or specialized language model. For example, the final version of the text may include revisions beyond the simple correction of words that were mis-recognized in the initial recognized text, e.g., rephrasing, change in word order, or change in word choice.

Figure 3B:
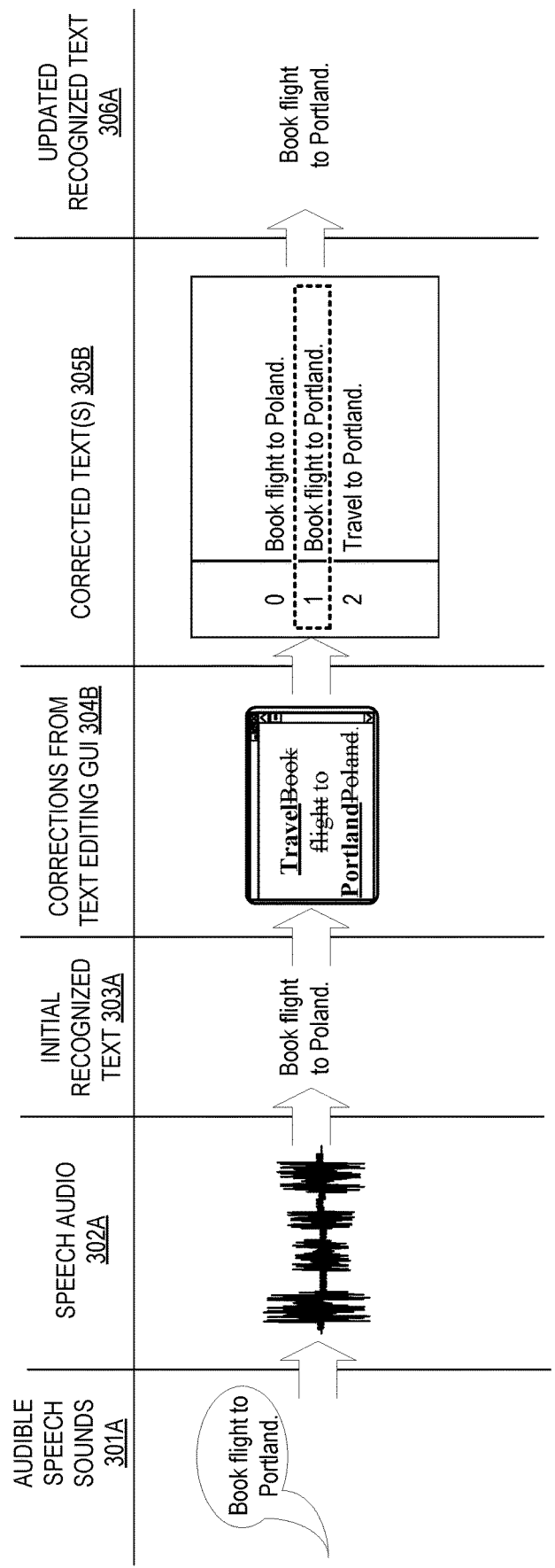

FIG. 3B shows another example of data-flow during training of a dictation system. FIG. 3B shows the same audible speech sounds 301A, speech audio 302A, and initial recognized text 303A as in FIG. 3A. However, in addition to correcting the word "Poland" to "Portland," the speaker has further revised the text in the text editing GUI, so that the corrections 304B and final version of corrected text(s) 305B deviate from the actual words in the audible speech sounds 301A. As a result of these changes, the vocabulary featured in the final version of the corrected text(s) may not include some of the words that actually occurred in the audible speech sounds 301A. Accordingly, a corrected text model based on the final version of the corrected text(s) may fail to recognize some of the words. For example, the words "book flight" have been replaced by the word "travel." Accordingly, speech recognition using the corrected text model may fail to recognize either of the words "book," and "flight" as those words are not present in the vocabulary of the final version of the corrected text. Furthermore, words in the vocabulary of the corrected text may not be a good match for any portion of the speech audio (e.g., an acoustic model may determine that the word "travel" does not match well to the sounds featuring the actual words "book" or "flight."). Accordingly, the corrected text model may fail to accurately recognize words in the speech audio 302A.

Nevertheless, a specialized language model combining the corrected text model and the general language model may accurately recognize words in the speech audio 302A. For example, the specialized language model may be configured to use the corrected text model when it achieves an accurate translation (e.g., assessing accuracy of translation based on an acoustical model or any other suitable assessment), and to "fall back" to the general model when the corrected text model fails to achieve an accurate translation (e.g., when the acoustical model indicates a poor alignment between the speech audio 302A and recognized text). Accordingly, as shown in FIG. 3B, speech recognition using the specialized language model may result in the correct updated recognized text 306A.

Alternately or additionally to "falling back" to the general model, in some examples, the corrected text is a partially corrected text based on only a portion of the corrective edits input by the speaker. For example, as shown in FIG. 3B, the final version of corrected text(s) 305B deviates from the actual words featured in the audible speech sounds 301A. Accordingly, the corrected text model may be based on the $1^{st}$ version of corrected text(s) 305B, reading "Book flight to Portland." Using an intermediate version of the corrected text may achieve superior accuracy for the updated recognized text, compared to using a final version, e.g., when the final version includes revisions that deviate from the actual words featured in the audible speech sounds 301A. In some examples, the version of corrected text used for the corrected text model may be a version for which the acoustical model indicates the highest quality of alignment between the speech audio 302A and the recognized text.

In some examples, the portion of the corrective edits that are used for re-recognition include only corrective edits causing at most a threshold amount of change to the initial text. The amount of change may be assessed in any suitable manner, e.g., using a natural language processing model for similarity of text, using the acoustical model to compare acoustical features of words added/replaced in the corrected text, edit distance and/or number of added/deleted words and/or characters.

In some examples, the portion of the corrective edits that is used for re-recognition includes only the corrective edits that were input by the speaker during the dictation session, e.g., during a relatively brief window of time after the speech audio signal was recorded. For example, the dictation session may begin at the point at which recording started, and end at the point at which a text editor GUI associated with the dictation session is closed (e.g., after inputting any number of revisions and saving the corrected text). Accordingly, if the text editor GUI is later opened to further revise the text, such further revisions would not be used for re-recognition. In some examples, the dictation session may be considered to end after a predefined duration. In some examples, the dictation session may be considered to end after the user stops supplying corrections and the text editing interface becomes idle for a predefined duration. Alternately or additionally, the beginning and ending of the dictation session may be delineated in any suitable manner, e.g., according to user preferences and/or according to explicit user commands to start/end the dictation session.

Although the techniques described herein may achieve superior performance when the corrected text is not extensively changed as compared to the initial recognized text, a specialized language model based on a corrected text model and a "fallback" general language model may be used to recognize accurate updated recognized text, even when the corrected text used for the corrected text model is extensively changed (e.g., when the corrected text is a final version of corrected text). Even if the corrected text model does not result in accurate recognition of words from the audible speech sounds, the "fallback" general language model may recognize the words with at least the same level of accuracy as when the general language model was used to recognize the initial recognized text. As such, the updated recognized text may be relatively accurate, as compared to the initial recognized text or the corrected text. Accordingly, the updated recognized text may be used to generate labels for the speech audio which may be used to train the general language model, thereby improving performance of the general language model for future dictation sessions and/or speech recognition tasks.

Language models (e.g., general language model 123, corrected text models, and/or specialized language model 124) may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

The speech recognition machine 122 of dictation system 100 may be configured to align a candidate word (e.g., a single word or a longer phrase) with a candidate audio segment of the audio signal. Based on such alignment, the language model may assess an overall confidence value indicating a quality of the alignment, e.g., based on statistical features and confidence values output by statistical models, neural networks, and/or acoustical models included in the language model. After aligning the candidate word with the candidate audio segment, the language model may align further candidate words with further candidate audio segments, thereby breaking up the original audio signal into a number of audio segments, each aligned with a candidate word. An alignment confidence value may be assessed for an alignment of a candidate audio segment with a candidate word, e.g., based on the statistical features and confidence values output by the statistical models, neural networks, and/or acoustical models.

The language model may work in conjunction with a separate segmentation model configured to break up the audio signal into candidate segments for alignment with candidate words. Alternately or additionally, the language model may recognize candidate segments for processing while aligning the segments, e.g., by attempting to align many different candidate segments, and delineating a candidate segment responsive to determining a high alignment confidence value for aligning the candidate segment with a word. Alternately or additionally to segmenting and aligning words, the language model may be based on any other suitable method for converting audio signals into candidate words, e.g., vector quantization, and/or neural network approaches such as wav2letter.

In some examples, the language model is a mixture of different language models. For example, specialized language model 124 may be a mixture of general language model 123 which is configured to recognize words in a general vocabulary (e.g., a vocabulary shared by a large population of speakers), and a corrected text model which is configured to recognize words in a narrower vocabulary (e.g., a vocabulary associated with a dialect of a smaller group of speakers, and/or a vocabulary associated with domain-specific jargon).

In some examples, a mixture of language models may be biased to favor recognition of words by one or more models in the mixture, as compared to other models in the mixture. In some examples, speech recognition using the mixture of language models includes, for each candidate audio segment being processed, using each of the models in the mixture to align the segment with a candidate word, and then picking a candidate word with the best alignment confidence. In some examples, biasing the mixture of language models to favor recognition of words by one of the models may include scaling the alignment confidence for each model by a different weighting factor for each model, so as to increase a likelihood of picking words from one of the models even when that model originally assessed a relatively low alignment confidence.

For example, in a weighted mixture of models including general language model 123 and a corrected text model, the confidence values for the corrected text model may be multiplied by a scalar factor, e.g., 2.0, so that alignments from the corrected text model will have relatively higher confidence values. In the example shown in FIG. 3B, the corrected text model may recognize the first word ("book") as the word "travel" with a relatively low confidence of 0.1, whereas the general language model may recognize the first word correctly as the word "book" with a confidence of 0.5. Accordingly, even after scaling the corrected text model confidence of 0.1 by a factor of 2.0, the scaled confidence value of 0.2 is less than the general language model confidence of 0.5. Accordingly, the weighted mixture of models may be configured to use the general language model's result and recognize the first word as "book". In contrast, the corrected text model may recognize the word "Portland" correctly as "Portland" with a confidence of 0.3, resulting in a scaled confidence of 0.6. If the general language model recognizes the word "Portland" incorrectly as "Poland" with a confidence of 0.5, then the scaled confidence of 0.6 for the corrected text model exceeds the confidence of 0.5 for the general language model. Accordingly, the specialized language model is configured to use the corrected text model's result, "Portland," for the fourth word.

Alternately or additionally, the weighted mixture of models may be based on using recognition results from the corrected text model as long as the scaled confidence value exceeds a predefined threshold value. For example, the corrected text model's recognition of the first word "book" as the word "travel" may have a scaled confidence of 0.2. With a predefined threshold value of 0.5, the corrected text model's result would not exceed the threshold and accordingly, the specialized language model is configured to fall back to using the general model.

Alternately or additionally, the specialized language model may be constructed as any other interpolated model, interpolating between the corrected text model and the general language model. In some examples, the interpolated model may be described as a weighted mixture of the corrected text model and the general language model. In some examples, the specialized language model may be based on a union and/or composition of graphical models, e.g., by adding transition probabilities from the corrected text model into the general model.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Computing system 100 from FIG. 1 is a computer system configured to provide any to all of the compute functionality described herein. Computing system 100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 100 may be a stand-alone or cloud-supported computerized intelligent assistant.

Computing system 100 includes a logic subsystem 106 and a storage subsystem 108. Computing system 100 further includes a microphone 105. Computing system 100 may optionally include a display subsystem 102, input subsystem 104, communication machine 110, and/or other subsystems not shown in FIG. 1.

Logic subsystem 106 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 108 includes one or more physical devices configured to temporarily and/or permanently hold computer information such as data and instructions executable by the logic subsystem. When the storage subsystem includes two or more devices, the devices may be collocated and/or remotely located. Storage subsystem 108 may include volatile, nonvolatile, dynamic, static, read/write, read-only, random-access, sequential-access, location-addressable, file-addressable, and/or content-addressable devices. Storage subsystem 108 may include removable and/or built-in devices. When the logic subsystem executes instructions, the state of storage subsystem 108 may be transformed—e.g., to hold different data.

Aspects of logic subsystem 106 and storage subsystem 108 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. For example, logic subsystem 106 and storage subsystem 108 of computing system 100 are configured to instantiate secure data store 121, speech recognition machine 122, general language model 123, and/or specialized language model 124. As used herein, the terms "machine" and "language model" are used to collectively refer to hardware and any software, instructions, and/or other components cooperating with such hardware to provide computer functionality. In other words, "machines" and "language models" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines and language models may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines and/or language models include maximum likelihood models, maximum entropy models, support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, super-segmental models (e.g., hidden dynamic model)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback), generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

For example, a dictation system according to the present disclosure may be trained to perform speech recognition for different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, display subsystem 102 may be used to present a visual representation of data held by storage subsystem 108. This visual representation may take the form of a graphical user interface (GUI). Display subsystem 102 may include one or more display devices utilizing virtually any type of technology. In some implementations, display subsystem may include one or more virtual-, augmented-, or mixed reality displays.

When included, input subsystem 104 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones (e.g., a microphone, stereo microphone, position-sensitive microphone and/or microphone array) for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication machine 110 may be configured to communicatively couple computing system 100 with one or more other computing devices. Communication machine 110 may include wired and/or wireless communication devices compatible with one or more different communication protocols. The communication subsystem may be configured for communication via personal-, local- and/or wide-area networks.

In an example, a method for eyes-off training of a dictation system comprises: translating an audio signal featuring speech audio of a speaker into an initial recognized text using a previously-trained general language model; providing the initial recognized text for error correction by the speaker; recognizing a corrected text including the speaker's error corrections to the initial text; translating the audio signal into an updated recognized text using a specialized language model biased to recognize words included in the corrected text; and eyes-off retraining the general language model based on the audio signal and the updated recognized text. In this example or any other example, the corrected text is recognized based on corrective edits input by the speaker at a text editing graphical user interface. In this example or any other example, the corrected text is a final version text based on all of the corrective edits input by the speaker. In this example or any other example, the corrected text is a In this example or any other example, the portion of the corrective edits input by the speaker includes only corrective edits input by the speaker during a dictation session during which the audio signal was recorded In this example or any other example, the portion of the corrective edits input by the speaker includes only corrective edits causing at most a threshold amount of change to the initial text In this example or any other example, the specialized language model is a weighted mixture of the previously-trained general language model and a corrected text model configured to recognize words included in the corrected text. In this example or any other example, the audio signal, the initial recognized text, the corrected text, and the updated recognized text are private data of the speaker, wherein access to the private data is constrained by a credential of the speaker. In this example or any other example, eyes-off-training the general language model includes assessing one or more metrics of the general language model, wherein the one or more metrics do not reveal details of the audio signal, the initial recognized text, the corrected text, or the updated recognized text. In this example or any other example, the method further comprises deleting the audio signal, the initial recognized text, the corrected text, and the updated recognized text after eyes-off retraining the general language model based on the audio signal and the updated recognized text. In this example or any other example, the method further comprises eyes-off training a speaker-specific language model for the speaker based on the audio signal and the updated recognized text. In this example or any other example, access to the speaker-specific language model is constrained by a credential of the speaker.

In an example, a method for eyes-off training of a dictation system comprises: translating an audio signal featuring speech audio of a speaker into an initial recognized text using a previously-trained general language model; providing the initial recognized text for error correction by the speaker; recognizing a corrected text including the speaker's error corrections to the initial text; translating the audio signal into an updated recognized text using a specialized language model biased to recognize words included in the corrected text, wherein the specialized language model is a weighted mixture of the previously-trained general language model and a corrected text model configured to recognize words included in the corrected text; and eyes-off training the general language model based on the audio signal and the updated recognized text. In this example or any other example, the corrected text is recognized based on corrective edits input by the speaker at a text editing graphical user interface. In this example or any other example, the corrected text is a final version text based on all of the corrective edits input by the speaker. In this example or any other example, the corrected text is a partially corrected text based on only a portion of the corrective edits input by the speaker. In this example or any other example, the audio signal, the initial recognized text, the corrected text, and the updated recognized text are private data of the speaker, wherein access to the private data is constrained by a credential of the speaker.

In an example, a dictation system comprises: a microphone configured to convert sound into audio signals; a speech recognition machine configured to translate an audio signal featuring speech audio of a speaker into an initial recognized text using a previously-trained general language model; a text editing graphical user interface configured to provide the initial recognized text for error correction by the speaker, and to recognize a corrected text including the speaker's error corrections to the initial text based on corrective edits input by the speaker at the text editing graphical user interface, wherein the audio signal is translated into an updated recognized text using a specialized language model biased to recognize words included in the corrected text; and a communication machine configured to supply the audio signal and the updated recognized text for eyes-off retraining the generalized language model. In this example or any other example, the corrected text is a final version text based on all of the corrective edits input by the speaker. In this example or any other example, the corrected text is a partially corrected text based on only a portion of the corrective edits input by the speaker. In this example or any other example, the audio signal, the initial recognized text, the corrected text, and the updated recognized text are private data of the speaker, wherein access to the private data is constrained by a credential of the speaker.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for eyes-off training of a dictation system, the method comprising:
translating an audio signal featuring speech audio of a speaker into an initial recognized text using a previously-trained general language model;
providing the initial recognized text for error correction by the speaker;
recognizing a corrected text including the speaker's error corrections to the initial recognized text;
translating the audio signal into an updated recognized text using a specialized language model biased to recognize words included in the corrected text; and
eyes-off retraining the general language model using the updated recognized text that the specialized language model translated from the audio signal to label the audio signal.

2. The method of claim 1, wherein the corrected text is recognized based on corrective edits input by the speaker at a text editing graphical user interface.

3. The method of claim 2, wherein the corrected text is a final version text based on all of the corrective edits input by the speaker.

4. The method of claim 2, wherein the corrected text is a partially corrected text based on only a portion of the corrective edits input by the speaker.

5. The method of claim 4, wherein the portion of the corrective edits input by the speaker includes only corrective edits input by the speaker during a dictation session during which the audio signal was recorded.

6. The method of claim 4, wherein the portion of the corrective edits input by the speaker includes only corrective edits causing at most a threshold amount of change to the initial text.

7. The method of claim 1, wherein the specialized language model is a weighted mixture of the previously-trained general language model and a corrected text model configured to recognize words included in the corrected text.

8. The method of claim 1, wherein the audio signal, the initial recognized text, the corrected text, and the updated recognized text generated by the specialized language model are private data of the speaker, wherein access to the private data is constrained by a credential of the speaker.

9. The method of claim 8, wherein eyes-off-training the general language model includes assessing one or more metrics of the general language model, wherein the one or more metrics do not reveal details of the audio signal, the initial recognized text, the corrected text, or the updated recognized text generated by the specialized language model.

10. The method of claim 8, further comprising deleting the audio signal, the initial recognized text, the corrected text, and the updated recognized text after eyes-off retraining the general language model based on the audio signal and the updated recognized text.

11. The method of claim 1, further comprising eyes-off training a speaker-specific language model for the speaker based on the audio signal and the updated recognized text.

12. The method of claim 11, wherein access to the speaker-specific language model is constrained by a credential of the speaker.

13. A method for eyes-off training of a dictation system, the method comprising:
translating an audio signal featuring speech audio of a speaker into an initial recognized text using a previously-trained general language model;
providing the initial recognized text for error correction by the speaker;
recognizing a corrected text including the speaker's error corrections to the initial text;
translating the audio signal into an updated recognized text using a specialized language model biased to recognize words included in the corrected text, wherein the specialized language model is a weighted mixture of the previously-trained general language model and a corrected text model configured to recognize words included in the corrected text; and
eyes-off training the general language model using the updated recognized text that the specialized language model translated from the audio signal to label the audio signal.

14. The method of claim 13, wherein the corrected text is recognized based on corrective edits input by the speaker at a text editing graphical user interface.

15. The method of claim 14, wherein the corrected text is a final version text based on all of the corrective edits input by the speaker.

16. The method of claim 14, wherein the corrected text is a partially corrected text based on only a portion of the corrective edits input by the speaker.

17. A dictation system, comprising:
- a microphone configured to convert sound into audio signals;
- a speech recognition machine configured to translate an audio signal featuring speech audio of a speaker into an initial recognized text using a previously-trained general language model;
- a text editing graphical user interface configured to provide the initial recognized text for error correction by the speaker, and to recognize a corrected text including the speaker's error corrections to the initial text based on corrective edits input by the speaker at the text editing graphical user interface, wherein the audio signal is translated into an updated recognized text using a specialized language model biased to recognize words included in the corrected text generated using the specialized language model; and
- a communication machine configured to supply the audio signal and the updated recognized text that the specialized language model translated from the audio signal to label the audio signal for eyes-off retraining the general language model.

18. The dictation system of claim 17, wherein the corrected text is a final version text based on all of the corrective edits input by the speaker.

19. The dictation system of claim 17, wherein the corrected text is a partially corrected text based on only a portion of the corrective edits input by the speaker.

20. The dictation system of claim 17, wherein the audio signal, the initial recognized text, the corrected text, and the updated recognized text generated by the specialized language model are private data of the speaker, wherein access to the private data is constrained by a credential of the speaker.

* * * * *